United States Patent Office 3,110,128
Patented Nov. 12, 1963

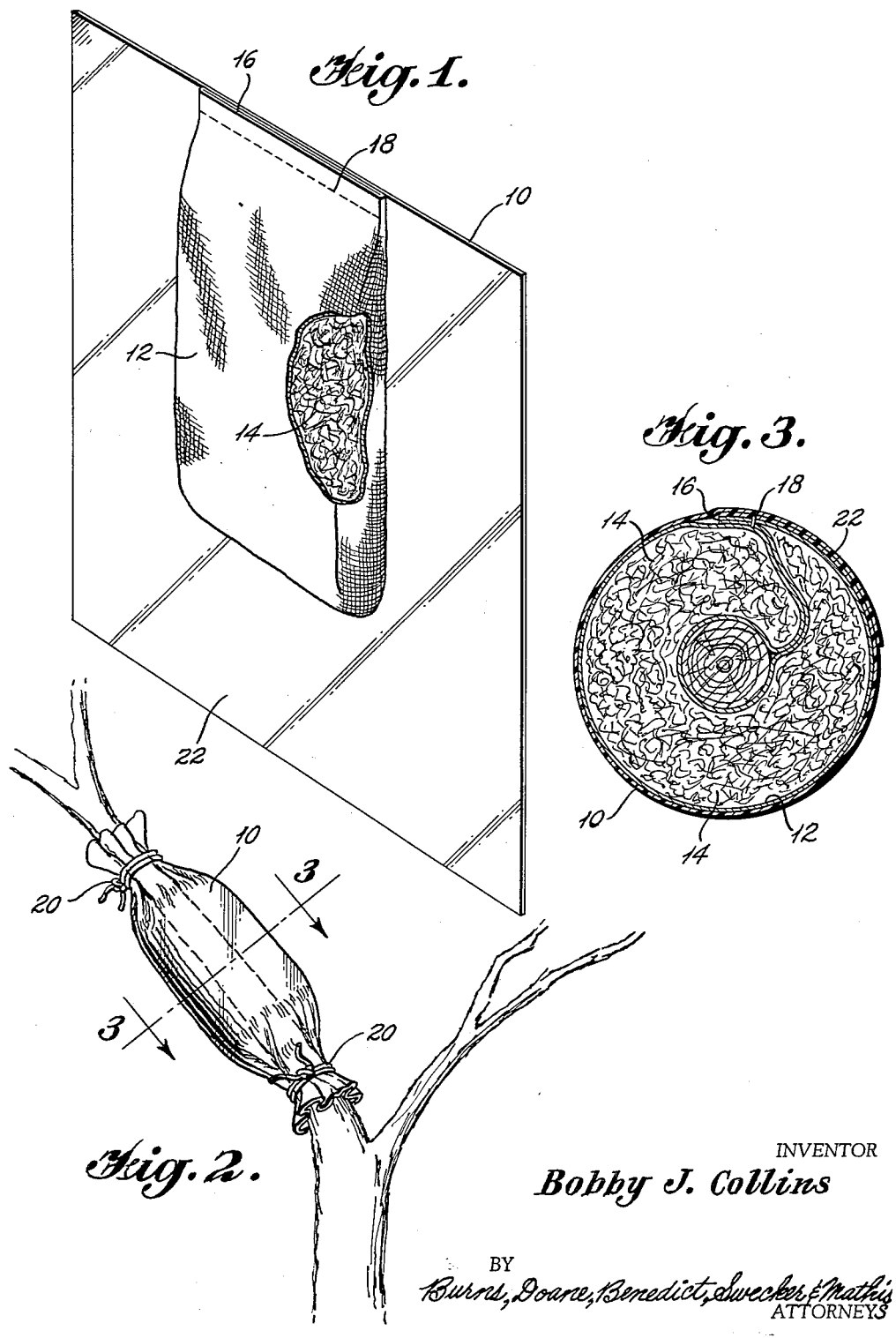

3,110,128
AIR-LAYERING WRAP
Bobby J. Collins, 655 Pinecrest Drive, Bartow, Fla.
Filed May 23, 1962, Ser. No. 197,051
3 Claims. (Cl. 47—37)

This invention relates generally to the propagation of plants according to a method known as air-layering, and more specifically, to the provision of a wrap or package to perform this particular method of propagation.

This method of plant propagation, known as air-layering, has become quite popular among amateur gardeners. This method involves preparing an area on a limb of the plant which is to be propagated by scraping the bark from the limb or making a cut in the limb. This area is then surrounded with moistened sphagnum moss and secured thereto for a period of two weeks to several months. During this time, roots will form in the sphagnum moss and thereafter, the limb may be cut off and planted in suitable soil.

It is convenient to use a transparent plastic sheet for securing the sphagnum moss about the limb of the plant so the growth of roots may be visually observed, thus indicating the time for severing the limb from the plant.

A certain amount of sphagnum moss is used and should be moistened properly. Generally, this is accomplished by taking several handfulls of sphagnum moss, wetting the sphagnum moss and thereafter squeezing it out to remove excess moisture. The person then attempts to place the sphagnum moss about the prepared area on the limb while wrapping a sheet of material about the sphagnum moss to hold it in place. This operation is very difficult for an unskilled person to perform. After the sheet has been wrapped about the sphagnum moss, the ends are secured tightly to the limb by any suitable means. It is important that air be prevented from entering the enclosed sphagnum moss, thus drying the moss prematurely.

It is very difficult for an amateur to judge the right amount of sphagnum moss to be used in the process and even more difficult to distribute the sphagnum moss uniformly in sufficient thickness about the area prepared for the propagation process.

It is therefore an object of this invention to provide a wrap to overcome these objections.

It is a further object of this invention to provide an air layering wrap which can be applied by a single person and which results in proper distribution of the correct amount of sphagnum moss about the area to be propagated.

These and other objects of the invention may be accomplished according to one embodiment of the invention which is comprised of a sheet of transparent plastic, preferably polyethylene, and a rectangular bag of soft porous material, such as cotton webbing, which is filled with a predetermined amount of sphagnum moss and secured to the plastic sheet.

With this wrap, it is necessary after the limb to be propagated has been prepared, merely to place the one end of the sphagnum moss bag against the limb and roll the remaining portion of the bag about the limb, while simultaneously wrapping the plastic sheet about the bag of sphagnum moss. The ends of the plastic sheet extend beyond the sphagnum moss bag and may be secured to the limb of the plant by means of string, rubber bands, or other suitable means.

This invention is illustrated in the accompanying drawings, in which:

FIG. 1 is a perspective view of the air layering wrap;

FIG. 2 is a perspective view of the air layering wrap in secured position on a limb of a plant; and FIG. 3 is a cross-sectional view taken on line 3—3.

The air layering wrap is comprised of a transparent sheet 10 of plastic, preferably polyethylene. While it is not necessary that this sheet be transparent, it is more convenient in that one may see the formation of the roots and is better able to determine when to sever the limb from the plant. Aluminum foil or freezer wrapping paper may also be used.

A bag 12 of cotton webbing such as gauze or the like is filled with a predetermined amount of sphagnum moss 14. It is desirable that part of the bag 12 decomposes during the propagating period so the new roots may grow freely. While material other than cotton webbing may be used, it has been found that this material decomposes rapidly due to the acid condition of the sphagnum moss and the moisture. The amount of sphagnum moss is sufficient to substantially fill the bag so that when the bag is applied to a limb, it will form a cylinder of sphagnum moss of substantially uniform thickness. This assures that the sphagnum moss will be distributed correctly around the prepared area.

The bag may be secured along one edge 16 of the sheet 10 and substantially midway thereof. The bag may be secured to the sheet at 18 by stitching or any other suitable manner. Also, the end of the bag may be closed at the same time it is secured to the sheet 10.

It is the intention of this invention to provide these wraps in various sizes. The bags containing the sphagnum moss will be made in numerous predetermined sizes for use on limbs of various sizes. The length of the bag would be determined by the thickness of the limb with which it is to be used. The width of the bag need not vary since the width of the prepared area does not vary substantially.

The plastic sheet 10 would also vary in size according to the size of the bag 12. It is necessary only that the plastic sheet 10 extend beyond the width of the sphagnum moss bag 12 an amount sufficient to provide an area which may be secured to the limb by means of strings 20. Any other suitable fastening means such as rubber bands may be used. The length of the plastic sheet should be greater than the length of the sphagnum moss bag so that a portion 22 of the plastic sheet will overlap the wrapped portion of the wrap to prevent air entering under the sheet when it has been secured around the limb.

In propagating plants utilizing this invention, a wrap is selected which is recommended for the particular size of limb on which the process is to be performed. The limb is then prepared in the recommended manner. The bag of sphagnum moss is moistened and the excess moisture is removed therefrom. The bag 12 facilitates maintaining the proper amount of moisture in the sphagnum moss. The bag also contains the proper amount of sphagnum moss for the process. The edge 16 is then placed along the prepared area. The bag 12 along with the sheet 10 is then wrapped around the limb. The end portion 22 of the plastic sheet 10 overlaps itself, as shown in FIG. 3, to prevent entrance of air to the sphagnum moss. The ends of the plastic sheet may then be tied to the limb of the plant. It is necessary that the ends of the plastic sheet are secured tightly to the limb to prevent any air from entering into the sphagnum moss and thus drying out the moss.

It is readily apparent that this wrap enables this process to be quickly and easily accomplished by even a novice. This wrap provides the proper amount of sphagnum moss and assures the correct distribution of the sphagnum moss about the entire prepared area of the limb. The portion of the bag adjacent the limb will decompose due to the acid condition of the sphagnum moss and the moisture present, during the propagation period. This permits the roots to grow freely in the sphagnum moss.

The outer portion of the bag adjacent the transparent sheet will not completely decompose and will shade the tender new roots from excessive sunlight.

This novel wrap provides a means for air-layering which simultaneously forms a substantially cylindrical moss layer and a supporting cover, which in the preferred embodiment is transparent.

The sphagnum moss is packaged in a predetermined amount in a separate container which is intentionally designed to decompose during the propagation process so it need not be removed by the user.

The transparent plastic sheet enables a person to observe visually the formation of the roots. When several of such new roots are formed, the limb is severed from the plant below the propagated area and planted in suitable means. It is not necessary to remove the sphagnum moss from the severed limb, but actually it is the preferred practice to leave the sphagnum moss in place to avoid breaking off the new tender roots.

While the invention has been illustrated and described in one embodiment, it is recognized that other variations and changes may be made therein without departing from the invention as set forth in the claims.

I claim:

1. A wrap for propagating plants comprised of a sheet of water impervious, thin, flexible, readily foldable material, a substantially rectangular bag of a material which will decompose under moist acidic conditions, said bag being filled with a predetermined amount of moss, and means securing said bag to said sheet so that when said bag is applied to said plant the sheet will be applied simultaneously therewith.

2. A wrap for propagating plants comprised of a sheet of thin transparent plastic flexible and readily foldable, a substantially rectangular decomposable bag, said bag containing a predetermined amount of moss, means securing one end of said bag to said sheet so that when the bag is applied to a plant the sheet will be applied simultaneously therewith, and said sheet extending beyond the edges of said bag to provide means for securing said wrap to a plant.

3. A wrap for propagating plants comprised of a rectangular thin sheet of flexible and readily foldable polyethylene plastic, a substantially rectangular bag of cotton webbing, said bag being filled with a predetermined amount of sphagnum moss, said bag being secured along one of its ends to the polyethylene sheet adjacent one edge therewith and substantially midway of said edge, said bag being substantially smaller than said polyethylene sheet so that when said bag is wrapped around the limb of the plant to be propagated, said bag forms a cylinder of substantially uniform thickness around said area and said plastic sheet extending beyond the edges of said bag to provide means to secure the wrap to the plant.

References Cited in the file of this patent

UNITED STATES PATENTS 2,786,306      Eaton et al.            Mar. 26, 1957